Patented July 3, 1945

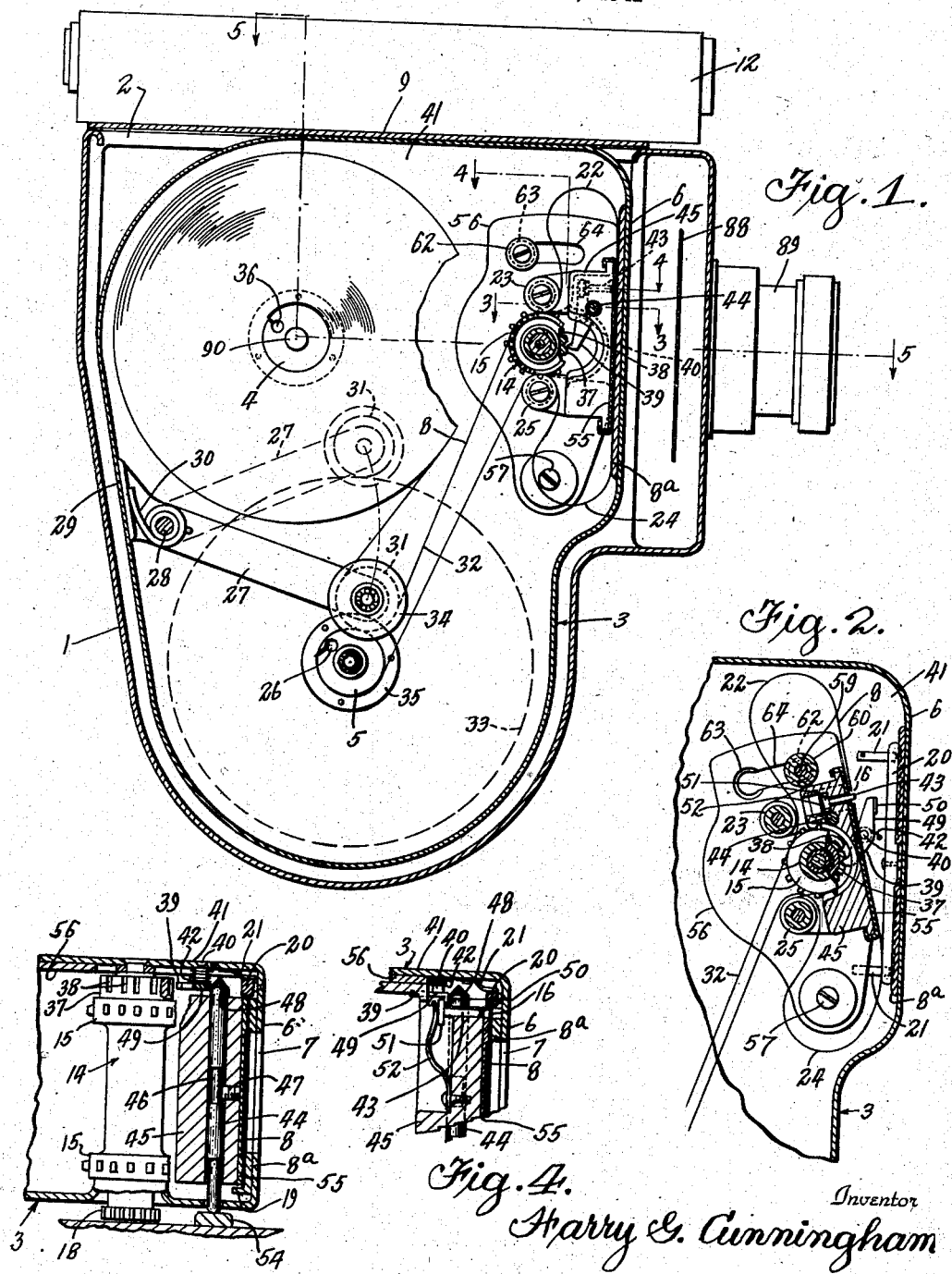

2,379,690

UNITED STATES PATENT OFFICE 2,379,690

CAMERA FILM MAGAZINE AND DRIVING MECHANISM

Harry G. Cunningham, Los Angeles, Calif.

Application December 22, 1941, Serial No. 423,873

5 Claims. (Cl. 242—71)

This invention relates to cameras, and while the improvements may be embodied in an ordinary camera, they are expected to be particularly useful when applied to motion picture cameras, or projection machines.

In the film magazine the film is carried on a supply reel from which the film is drawn off, guided past the light aperture, and then wrapped upon a take-up roller or reel. Heretofore various mechanisms have been suggested for effecting the rotation of the take-up roller or reel at a substantially uniform linear velocity at its periphery where the film is winding onto it. The construction of such mechanism involves the problem of rotating the take-up roller at a gradually changing speed as, of course, the angular velocity of this take-up roller decreases proportionately as the film accumulates on this roller or reel. In this connection it should be understood that the virtual diameter of the take-up roller is constantly changing, and the diameter of the roller onto which the film is being wrapped is measured, of course, over the outside or last layer of film that has been wrapped upon this roller.

One of the objects of this invention is to provide a simple construction for effecting the rotation of the take-up roller so that the linear velocity of the outer face of this take-up roller and the coil wrapped upon it, will be the same as the average velocity of movement of the film past the light aperture; and to accomplish this without the necessity for providing any means for actually driving the shaft of the take-up roller; in other words, to provide a construction in which the linear speed of the film itself is imparted to the take-up roller at the face of this roller or the coil of film wrapped upon it.

Further objects of the invention will appear hereinafter.

The invention consists in the novel parts and combination of parts to be described hereinafter, all of which contribute to produce an efficient camera film magazine and driving mechanism.

A preferred embodiment of the invention is described in the following specification, while the broad scope of the invention is pointed out in the appended claims.

In the drawing:

Fig. 1 is a vertical section through the camera body and through the film magazine, showing the same resting in its seat or well in the camera body. In this view certain parts are broken away. This view indicates the holding means for the film in its automatically released position. In other words, it indicates the film holding means after it has been released, by placing the film magazine in the camera body.

Fig. 2 is a vertical section taken through the film magazine in the vicinity of the light aperture, and passing through the guide for the film. This view particularly illustrates the manner in which this construction lends itself to the operation of threading the film through the film guide and adjacent guide rollers.

Fig. 3 is a horizontal section taken about on the line 3—3 of Fig. 1, and further illustrating the means for effecting the release of the holding means indicated in Fig. 1. This view shows certain parts broken away; also the holding means is shown in its released position.

Fig. 4 is a fragmentary view, and is a horizontal section taken about on the line 4—4 of Fig. 1 at a forward corner of the film magazine, and further illustrating details of the means for controlling the holding means. This view also shows the holding means in its released position.

Referring more particularly to the parts, and especially to Fig. 1, the camera body 1 is constructed with a "seat" or well 2 into which the film magazine 3 may be placed. This film magazine is provided with a supply roll 4 and a take-up roll 5, and its forward wall 6 is formed with a light-aperture 7 through which the film 8 may be exposed. After placing the film magazine in the camera body, the cover 9 may be closed down and secured in its closed position by a latch (not illustrated). If desired, this cover may be provided with a finder 12.

When the film magazine is placed within the camera body, a connection is effected to the driving mechanism by means not illustrated, for driving a feed roller 14 within the film magazine, said feed roller having the usual separated sprocket heads 15, the teeth of which mesh with the usual sprocket holes of the film. This driving connection is effected through the medium of a driving gear wheel which is located in a position to mesh with a driven gear wheel 18 which is rigidly mounted on the end of the sprocket roller 14.

The means for driving the take-up roller 5 will now be described.

The film 8, in passing the light-aperture 7, passes through a film guide 8a (see Fig. 3), which consists of a plate with a light-aperture registering with the light-aperture 7 already referred to, said guide plate having a fixed flange 19 at one edge against which the film is pressed lightly by a follower strip 20 on the opposite side that is pressed lightly against the edge of the film by springs 21. The film passes downwardly through the film guide 8a, but before reaching the guide is disposed in a loop 22 (see Fig. 1), the film being supplied to this loop by passing over the upper side of the sprocket roller 14, against which the film is held by a pressure roller 23 (see Fig. 1). After passing the light-aperture, the film is disposed in a lower loop 24, and from this point it passes upwardly and in contact with the under side of the sprocket roller against which it is held by a presser roller 25. From the presser roller 25 the film passes around the take-up roller 5, its end being anchored in a socket 26.

In order to actuate the take-up roller 5 at a linear speed for its periphery, which will take up the film at the proper speed and maintain the loop 24 intact, I provided a guide, and feed, roller which is mounted in such a way that its periphery or the face of a loop of the film, is maintained yieldingly in contact with the periphery of the roller 5, or the periphery of the coils of film accumulated on this roller. The means for this purpose may be constructed as desired, but preferably consists of a feed roller-carrier in the form of an arm 27 (see Fig. 1), which is pivotally supported on a pivot 28 at one end, on a bracket secured on the adjacent wall 29 of the film magazine. A light coil spring 30 exerts a yielding pressure on this arm 27 adjacent its pivotal connection, and the free end of this arm carries the feed roller 31 about which the film passes in a loop 32. The face of this film is yieldingly pressed against the periphery of the roller 5. In full lines in Fig. 1 this roller is shown holding a loop of film directly against the hub or core 5 of this roller, but of course, as the film accumulates on the take-up roller, the virtual diameter of this roller will enlarge as indicated by the dotted lines 33, which indicate a condition in which practically all the film has passed over to the take-up roller. The presser roller 31 is preferably provided with a flange 34 at one end, that overlaps one end of the roller 5 when the winding operation of the film commences. The take-up roller 5 has a flange 35 at the other end, that overlaps the end of the roller 31 when the winding operation commences. These flanges cooperate to hold the coils of film in position, one flange lining up one edge of the film, and the other lining up the other edge.

The supply roller 4 is provided with a socket 36 for anchoring the other end of the film.

When the film is held in the film magazine before the film magazine has been placed in the camera body, holding means carried by the film magazine, will maintain the film in a fixed position in the vicinity of the film guide 8a. In order to accomplish this, I provide one end of the sprocket roller 14 with a detent wheel 37 (see Figs. 1 and 3) said detent wheel having a periphery with equidistant circumferentially disposed sockets 38, and one of these sockets when the film magazine is not in the camera, is engaged by the tip of a pawl 39 (see Fig. 1) which pawl is mounted to rock on a pivot pin secured in the side wall 41 of the film magazine (see Fig. 2) and a coil spring 42 disposed around the pivot pin 40 exerts its force in a direction to maintain the tip of the pawl in engagement with the detent wheel or hub 37.

In addition to the pawl 39 for locking the sprocket roller 14, I also provide a detent pin or locking pin 43 (see Figs. 2 and 4). This pin, when the film magazine is not in the camera body, projects into one of the sprocket holes. This maintains the film in a set position with relation to the light-aperture 7, and insures the maintenance of the two film loops 22 and 24 referred to above and illustrated in Fig. 1. I provide automatic means for releasing this pawl or trigger 39, and also for withdrawing the locking pin 43 automatically when the film magazine is dropped down into its seat or well 2 in the camera body. For this purpose I provide a releasing pin 44 (see Fig. 3) that extends parallel with the sprocket roller 14, and mounted to slide longitudinally in a block 45. In order to limit the sliding movement of this pin, its middle portion may be formed with a neck 46 of reduced diameter so as to form two shoulders between which a set screw 47 is located. The inner end of the pin 44 is formed with a tapered or conical tip 48, and when the pin is shoved inwardly, this conical tip 48 rides on the edge of the tail 49 of the detent pawl 39, and swings the same into position in which it is indicated in Fig. 1, withdrawing the tip of the pawl from the detent wheel or collar 37. The movement of the detent lever 39 also effects the withdrawal of the pin 43. This is accomplished by providing a flange 50 projecting laterally from the tail of the pawl which engages under one edge of the head 51 formed on the outer end of the locking pin (see Fig. 4). This will withdraw the pin against the force of a small leaf spring 52, which urges the pin into its locking position.

In order to operate the push pin 44 automatically, the face of the well adjacent to the end of the push pin, is provided with a small cam block 54 having an inclined cam face, (not illustrated). As the rounded nose of the pin 44 comes down into position, it rides along the inclined face of this cam, and this pushes the pin inwardly.

In order to facilitate threading of the film adjacent the light-aperture, I prefer to mount the block 45 in a face plate 55 (see Fig. 2) which, at one side, is provided with a side plate 56 that is connected by a pivot screw 57 to the adjacent side wall 41 of the film magazine. In order to hold the block and the face plate 55 in the normal position in which they are shown in Fig. 1, a long pin 59 is secured in the side wall 41 and provided with a small spring pressed knob 60. This small knob 60 has a beveled end 62 that normally seats in an enlarged recess 63 in the end of a slot 64 in the plate 56 (see Fig. 1). By pulling the knob 60 outwardly, its tapered nose will be withdrawn from the recess 63, and this will permit the plate and the block to swing outwardly on the pivot screw 57 into the position illustrated in Fig. 2. This will facilitate threading the film over the face of the face plate 55, and engaging one of the sprocket holes 16 with the pin 43 that at this time will project outwardly through the face plate (see Fig. 2). In this way the size of the two loops 22 and 24 can be adjusted as the adjacent portions of the film are threaded over the teeth of the sprocket heads 15.

When the shutter 88 is cutting off the light, the feed of the film past the light aperture takes place.

It is desirable to provide the supply reel 4 with a slight resistance to rotation, and this may be accomplished by mounting this reel on a fixed pin 90 (see Fig. 1), any suitable friction brake (not illustrated) being employed in any well known manner to provide this resistance.

Before the magazine is put in the well of the camera body, the pin 43 is in an extended position with its tip projecting into one of the sprocket holes and also the detent pawl or holding pawl 39 (see Fig. 1) is in engagement with the notched wheel 37 (see Fig. 3). When the magazine is dropped down into position the projecting end of the releasing pin 44 rides on the cam block 54 (see Fig. 3) and this pushes this pin inwardly and causes its conical tip 48 to swing the detent pawl 39 into its releasing position as shown in Fig. 1. At the same time, this swinging movement of this detent 39 enables the flange 50 at its tail end (see Figs. 1 and 2) to withdraw the locking pin 43.

In operation the take-up roller 5 is not rotated at its center or shaft, but is caused to rotate through the medium of the loop 32 of the film that passes from the supply reel 4 around the roller 31. The spring 30 holds the film forming this loop, against the face of the take-up roller 5, either directly against its face as illustrated in full lines in Fig. 1, or against the periphery of the coil of film wrapped on this take-up reel, as illustrated in dotted lines in Fig. 1. In this way, the periphery of the take-up roller 5, is driven at the same linear speed that the film has by reason of rotation of the sprocket roller, and the step-by-step movement caused in the film by the film feeding mechanism.

It is obvious that this invention is applicable with equal facility to a motion picture camera for taking pictures, and projection machines.

As indicated in Fig. 1, the point of application of the turning movement by the film loop on the presser roller 31 is on the same side of the roller 5 as the point where the film passes onto the roller 5. This is advantageous because it tends to wrap the film more tightly onto the take-up roller.

Many other embodiments of the invention may be resorted to without departing from the spirit of the invention.

What I claim is:

1. In a reel driving apparatus for use with a camera having a film feeding mechanism for advancing the film with a step-by-step movement, the combination of a supply reel, a take-up reel, said reels being mounted on relatively fixed axes, a film guide between the reels through which the film passes in moving between the two reels, a guide roller, the film being passed from the supply reel thence around a portion of the periphery of the guide roller, means for imparting feeding movement to the film to impart rotation to the guide roller from the film in contact therewith and means for urging the guide roller toward the take-up reel to maintain an operative contact between the surface of the film on the guide roller and the take-up reel, and operating to impart the take-up rotation to the same.

2. A reel driving apparatus according to claim 1 in which the film on the guide roller is pressed against the wraps of film on the take-up reel on the same side of the take-up reel as the point at which the film is winding onto the take-up reel, and behind the same with respect to the direction of rotation of the take-up reel, whereby the guide roller maintains the film taut as it is wrapping onto the take-up reel.

3. In a reel driving apparatus for use with a camera having a film-feed mechanism for advancing the film, the combination of a magazine body, a supply reel and a take-up reel mounted therein, said reels being mounted on relatively fixed axes, a film guide between the reels and through which the film passes in moving from the supply reel to the take-up reel, a roller carrier in the form of a pivoted arm supported on the interior of the magazine body, a guide roller supported by the arm, the film being passed from the supply reel, thence around a portion of the periphery of the guide roller, means for imparting feeding movement to the film to pull the same past the guide roller and impart rotation from the film to the guide roller, and means for urging the arm toward the take-up reel to maintain a driving contact between the guide roller and the take-up reel and operating to impart the take-up rotation from the guide roller to the take-up reel.

4. In a reel driving apparatus for use with a camera having a film feed mechanism for advancing the film, a magazine body, a supply reel, a take-up reel, both of said reels being mounted within and on said magazine body on axes fixed with respect to each other, a guide roller, means for mounting said roller on said body for movement towards and away from the take-up reel in a manner to cause the roller to exert pressure on the film being wound onto the take-up reel, whereby a film may be fed from the supply reel thence under the roller and to be pressed against the film on the take-up reel to impart motion to the take-up reel.

5. In a reel driving apparatus for a camera, a supporting frame, a supply reel and a take-up reel, means for rotatably mounting said reels on axes fixed with respect to each other, a unitary driving and guiding roller, means for mounting said roller on said frame for movement towards and away from the take-up reel, a yieldable means for biasing said roller towards the take-up reel in a manner to cause the roller to exert pressure on the film being wound onto the take-up reel, whereby a film may be fed from the supply reel thence under the guide roller and to be pressed against the film on the take-up reel to impart motion to the take-up reel.

HARRY G. CUNNINGHAM.